United States Patent
Skala et al.

(10) Patent No.: US 6,569,551 B2
(45) Date of Patent: May 27, 2003

(54) OXIDANT INJECTION CONTROL

(75) Inventors: Glenn W. Skala, Churchville, NY (US); David J. Hart-Predmore, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 304 days.

(21) Appl. No.: 09/761,083

(22) Filed: Jan. 15, 2001

(65) Prior Publication Data

US 2002/0094461 A1 Jul. 18, 2002

(51) Int. Cl.$^7$ ................................................ H01M 8/04
(52) U.S. Cl. ........................ 429/17; 429/25; 423/415.1
(58) Field of Search ..................... 429/17.25; 423/415.1

(56) References Cited

U.S. PATENT DOCUMENTS

| | | | |
|---|---|---|---|
| 4,046,956 A | * | 9/1977 | Fanciullo ..................... 429/20 |
| 4,904,548 A | | 2/1990 | Tajima |
| 5,271,916 A | | 12/1993 | Vanderborgh et al. |
| 5,272,017 A | | 12/1993 | Swathirajan et al. |
| 5,518,705 A | | 5/1996 | Buswell et al. |
| 5,637,415 A | | 6/1997 | Meltser et al. |
| 5,750,076 A | * | 5/1998 | Buswell ..................... 422/115 |
| 5,763,113 A | | 6/1998 | Meltser et al. |
| 6,001,499 A | | 12/1999 | Grot et al. |
| 6,322,917 B1 | * | 11/2001 | Acker ......................... 429/17 |
| 6,497,970 B1 | * | 12/2002 | Fronk .......................... 429/12 |
| 2002/0094461 A1 | * | 7/2002 | Skala ......................... 429/17 |

FOREIGN PATENT DOCUMENTS

| | | |
|---|---|---|
| EP | 710 996 A1 | 5/1996 |
| EP | 911 629 A1 | 4/1999 |

OTHER PUBLICATIONS

Patent Abstract of Japan —JP406223850A, Aug. 12, 1994, "Operation Protecting Systems for Solid High Polymer Electrolyte Fuel Cell," Hashizaki, Katsuo.

Patent Abstract of Japan —JP401239772A, Sep. 25, 1989, "Protection Device of Fuel Cell and its Operating Method," Uozumi, Shohei et al.

Patent Abstract of Japan —JP401089155A, Apr. 3, 1989, "Protection Unit for Fuel Cell," Uozumi, Shohei et al.

Patent Abstract of Japan —JP404115467A, Apr. 16, 1992, "Phosphate Type Fuel Cell Generating Plant," Sakai, Katsunori.

* cited by examiner

Primary Examiner—Patrick Ryan
Assistant Examiner—Mark Ruthkosky
(74) Attorney, Agent, or Firm—Karl F. Barr, Jr.; Cary W. Brooks; Linda M. Deschere

(57) ABSTRACT

The invention provides a novel method for controlling the oxidant injection to a reactor by determining fluctuations in the requirements from monitoring the flow rates and pressures of an upstream reactor. The method is used to oxidize carbon monoxide in a hydrogen-rich reformate stream supplied to a fuel cell.

16 Claims, 3 Drawing Sheets

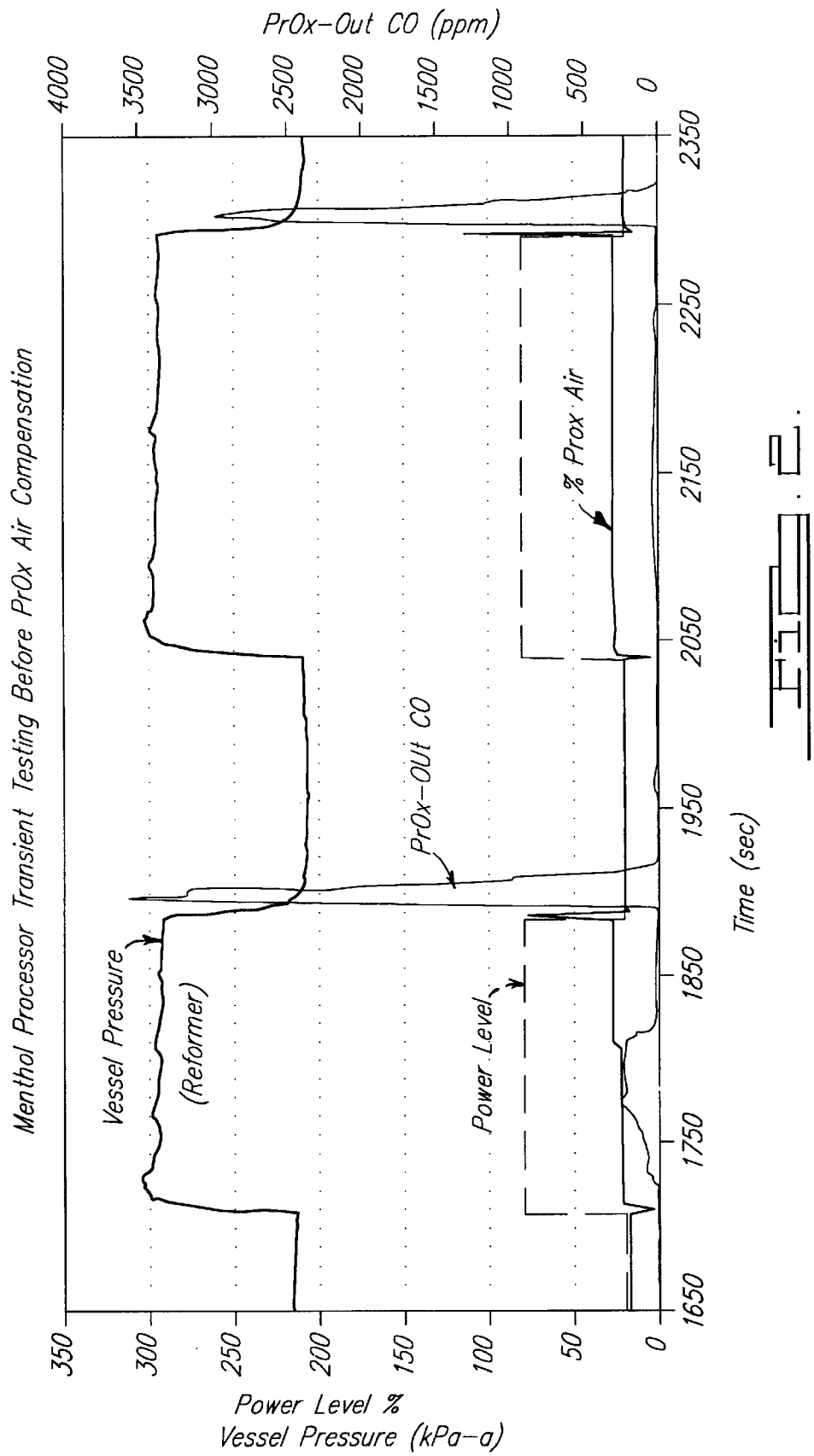

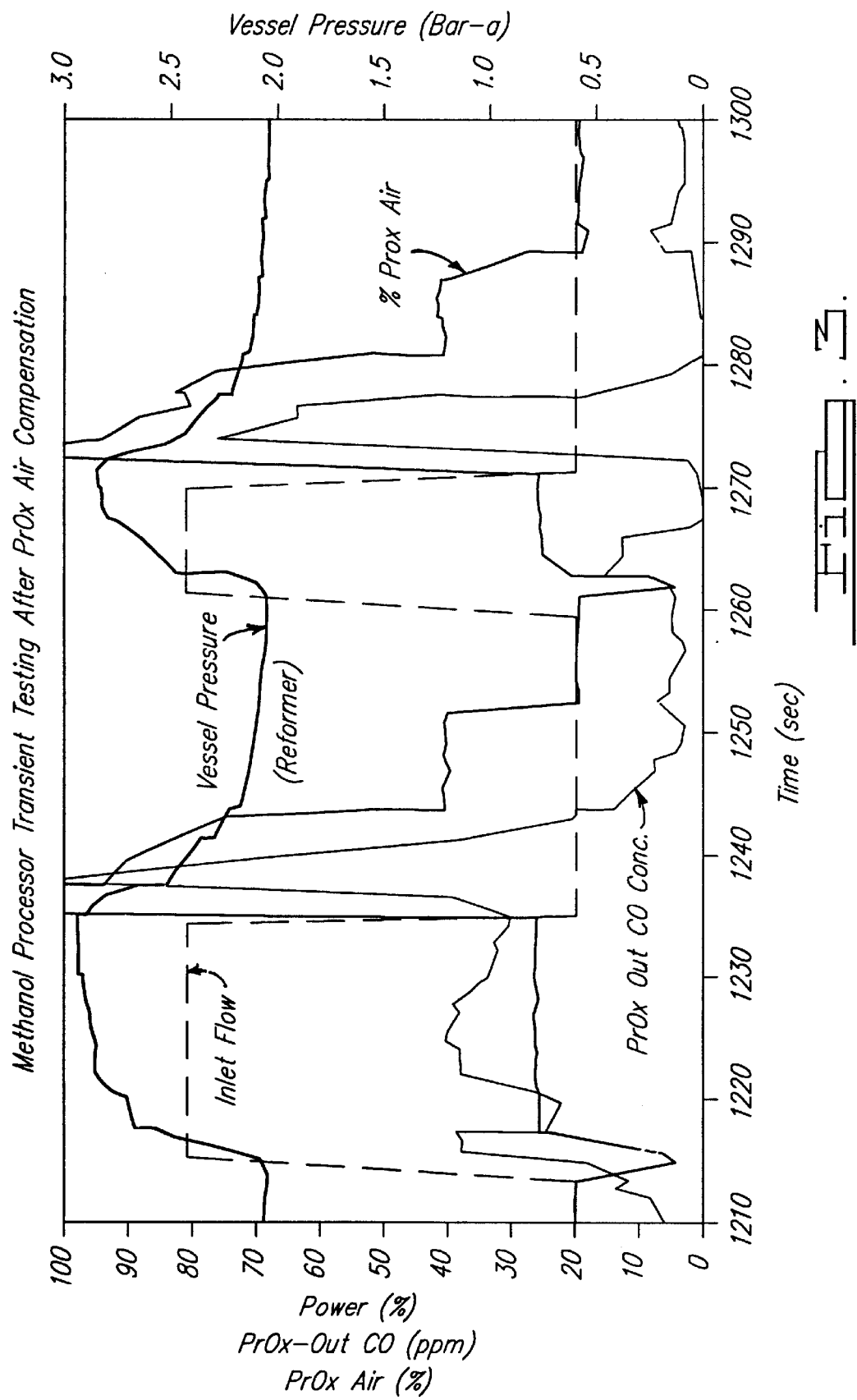

OXIDANT INJECTION CONTROL

FIELD OF THE INVENTION

This invention relates to a fuel cell system and more particularly to a system having a plurality of cells which consume an $H_2$-rich gas to produce power for vehicle propulsion.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements which (1) serve as current collectors for the anode and cathode, and (2) contain appropriate channels and/or openings therein for distributing the fuel cells gaseous reactants over the surfaces of the respective anode and cathode catalysts. A plurality of individual cells are commonly bundled together to form a PEM fuel cell stack. The term fuel cell is typically used to refer to either a single cell or a plurality of cells (stack) depending on the context. A group of cells within the stack is referred to as a cluster. Typical arrangements of multiple cells in a stack are described in U.S. Pat. No. 5,763,113, assigned to General Motors Corporation.

In PEM fuel cells hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and admixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

For vehicular applications, it is desirable to use a liquid fuel such as an alcohol (e.g., methanol or ethanol), or hydrocarbons (e.g., gasoline) as the source of hydrogen for the fuel cell. Such liquid fuels for the vehicle are easy to store onboard and there is a nationwide infrastructure for supplying liquid fuels. However, such fuels must be dissociated to release the hydrogen content thereof for fueling the fuel cell. The dissociation reaction is accomplished within a chemical fuel processor, also known as a reformer. The reformer contains one or more reactors wherein the fuel reacts with steam and sometimes air, to yield a reformate gas including primarily hydrogen and carbon dioxide. For example, in the steam methanol reformation process, methanol and water (as steam) are ideally reacted to generate hydrogen and carbon dioxide. In reality, carbon monoxide and water are also produced. In a gasoline reformation process, steam, air and gasoline are reacted in a reformer which contains two sections. One is primarily a partial oxidation reactor (POX) and the other is primarily a steam reformer (SR). The reformer produces hydrogen, carbon dioxide, carbon monoxide and water. Downstream reactors such as a water/gas shift (WGS) and preferential oxidizer (PROX) reactors are used to produce carbon dioxide ($CO_2$) from carbon monoxide (CO) using oxygen from air as an oxidant. Here, control of air feed is important to selectively oxidize CO to $CO_2$.

Fuel cell systems which process a hydrocarbon fuel to produce a hydrogen-rich reformate for consumption by PEM fuel cells are known and are described in co-pending U.S. patent application Ser. Nos. 08/975,422 and 08/980,087, filed in November, 1997, and 09/187,125, filed in November, 1998, and each assigned to General Motors Corporation, assignee of the present invention; and in International Application Publication Number WO 98/08771, published Mar. 5, 1998. A typical PEM fuel cell and its membrane electrode assembly (MEA) are described in U.S. Pat. Nos. 5,272,017 and 5,316,871, issued respectively Dec. 21, 1993 and May 31, 1994, and assigned to General Motors Corporation.

Efficient operation of a fuel cell system depends on the ability to effectively control the quality of the hydrogen feed stream to the fuel cell, especially maintaining a low level of carbon monoxide within the hydrogen gas stream supplied to the anode in the fuel cell stack. This is particularly difficult during transient operation of a vehicular fuel cell system wherein the reformate fuel requirement varies with the changing loads placed on the fuel cell.

Therefore, it is desirable to provide a method to control the amount of carbon monoxide in the hydrogen rich gas stream to the anode and at the same time minimizing the consumption of the hydrogen in the anode fuel stream.

SUMMARY OF THE INVENTION

The present invention is directed towards controlling the supply of oxygen for the promotion of oxidization of carbon monoxide while avoiding excessive oxidization of hydrogen in reformate stream useable in a fuel cell system.

The fuel cell system of the present invention comprises a source of a reformate stream which contains hydrogen and carbon monoxide (CO). The reformate stream typically contains more hydrogen on a volume basis than CO. The fuel cell system further comprises a PROX reactor for selectively oxidizing the CO through contact of the stream with a catalyst inside the PROX reactor chamber. The catalyst is supported by a carrier within the chamber and the chamber includes an inlet and an outlet allowing the stream to pass through the reactor chamber and over the catalyst.

The fuel cell system further comprises an apparatus for supplying controlled amounts of an oxidant, gaseous mixture containing oxygen, or preferably air, into the stream containing hydrogen and CO at a predetermined location or locations along the stream. This control is preferably achieved by an air injector. In one location, the injector is placed downstream from the reformate source, but upstream from the PROX reactor. Another location is directly into the PROX reactor.

A precisely controlled supply of an oxidant provides a sufficient amount of oxygen to promote oxidation and thereby consumption of CO with minimal or lesser oxidation and consumption of hydrogen in the stream which is essential for efficient operation of the fuel cell and system. The advantageous result is a CO depleted reformate stream with high levels of hydrogen feeding the anode in the fuel cell. The fuel cell system further comprises one or more fuel cells downstream of the PROX reactor which receives and consumes the hydrogen-rich, CO depleted reformate stream to produce electrical energy.

The preferred oxidant is air. Other oxidants include oxygen-containing compounds, and mixtures comprising oxygen, and essentially pure oxygen. For convenience, the invention will be further described with reference to the preferred oxidant which is air.

The present invention may also be used to control injection of air between the PROX reactor and the fuel cell. This promotes oxidation of remaining unreacted CO in the stream prior to the stream entering the anode inlet in the fuel cell. Thereby, the CO content of the stream is further reduced.

In its broadest aspect, the invention may be utilized in any system having a first vessel upstream of a second vessel wherein the second vessel is used to oxidize a constituent of the gas stream supplied from the first vessel. The method includes measuring the flow rate of inlet streams to the first vessel; determining the flow rate of the outlet stream from the first vessel, and determining the composition of the outlet stream; determining the flow rate of oxidant injection to the second vessel; measuring the pressure of the first vessel; and adjusting the flow rate of oxidant injection to the second vessel. As an alternative, the pressure of the first vessel can be measured in the outlet stream of the first vessel.

An aspect of the invention is the computation of the oxidant injection. The oxidant injection is computed from the requirements based upon the inlet streams to the first vessel. The oxidant requirements are subsequently modified and updated on a transient basis based upon changes in the pressure within the first vessel. The oxidant requirements follow the formula, $FO_n = OFS - k*(P_{n-1}/P_n)*(OFS - FO_{n-1})$, wherein OFS is the oxidant computed from the feed streams to the first vessel, $P_n$ is the pressure of the first vessel at time $T_n$, $P_{n-1}$ is the pressure of the first vessel at an earlier time $T_{n-1}$, $FO_{n-1}$ is the flow rate of oxidant at the earlier time $T_{n-1}$, k is a lag filter coefficient, and $FO_n$ is the computed flow rate of oxidants.

Another embodiment of this invention is the application of the invention to the preferential oxidizer and the fuel cell. The oxidant injection to the preferential oxidizer in the fuel cells is controlled by determining flow rates of the inlet streams to the reformer upstream of the preferential oxidizer; determining the flow rate of the outlet stream and the composition of the outlet stream, more particularly the carbon monoxide content; determining the pressure in the reformer; determining the oxidant injection to the preferential oxidizer; and using a different lag filter coefficient, determining the oxidant injection to the fuel cell.

In another aspect, the oxidant injection is adjusted to the preferential oxidizer and the fuel cell. The oxidant injection to the preferential oxidizer is controlled by determining the flow rates of the inlet streams to the reformer; determining flow rate of the outlet stream from the reformer; determining the carbon monoxide content in the outlet stream from the reformer; determining the pressure in the reformer; and determining the oxidant injection to the preferential oxidizer. The oxidant injection to the fuel cell is controlled by determining the flow rates of the inlet streams to the preferential oxidizer; determining the flow rate of the outlet stream from the preferential oxidizer; determining the carbon monoxide content in the outlet stream from the preferential oxidizer; determining the pressure in the preferential oxidizer; and determining the oxidant injection to the fuel cell.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 2 shows the carbon monoxide response to changes in power levels, or reformer feed streams, without the present invention; and FIG. 3 shows the carbon monoxide response to changes in power levels, or reformer feed streams, with the present invention.

DETAILED DESCRIPTION OF THE PREFERRED EMBODIMENTS

Figure 1:
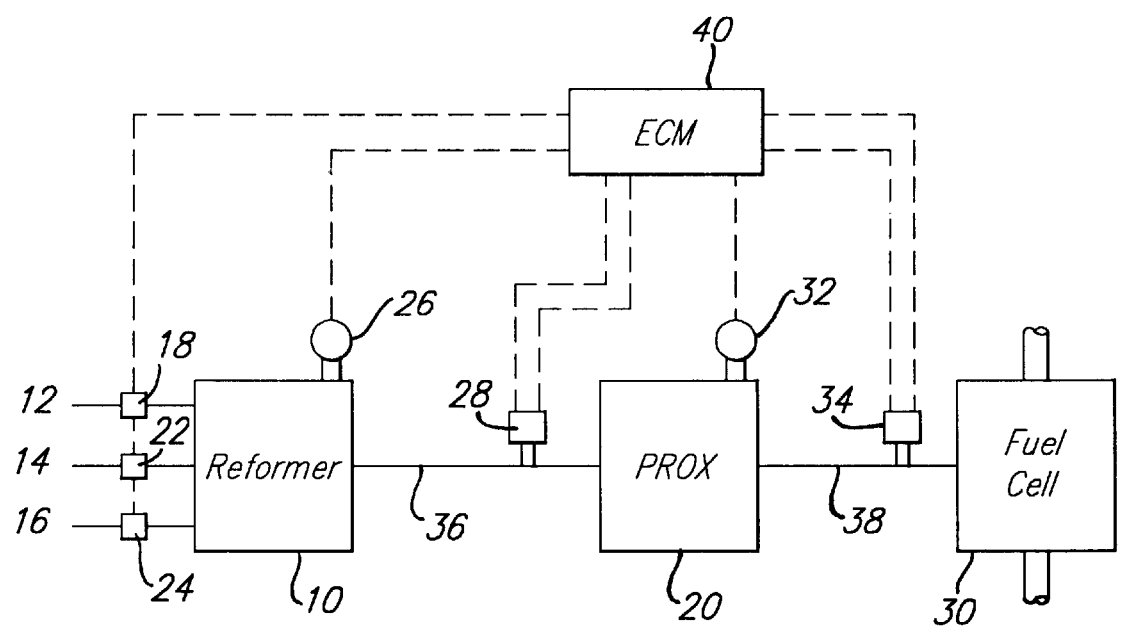
FIG. 1 is a schematic view of the reformer reactor, preferential oxidizer, and fuel cell with an electronic control module controlling the air injection to the prox and the fuel cell.

It was discovered in a system comprising two reaction vessels in series, an upstream vessel and a downstream vessel, that information from the upstream vessel can be utilized to control a feed stream to the downstream vessel. The invention utilizes the flow rates of inlet streams and pressures in the upstream vessel to control the flow rate of oxidant to the downstream vessel.

Carbon monoxide (CO) has deleterious effects on fuel cells and the removal of CO is important to prevent fouling of the catalyst in the fuel cells. The present invention provides for methods of treating the CO contaminate in a hydrogen ($H_2$) rich gas. Referring generally to FIG. 1, the method and apparatus used in the present invention are shown. More specifically, the invention provides better control for oxygen injection to a preferential oxidizer by utilizing transient pressure changes in an upstream reformer reactor to determine transient changes in the oxidant requirements to the preferential oxidizer.

As shown in FIG. 1, the fuel cell apparatus includes a fuel reformer 10 for catalytically converting the hydrocarbon fuel and water into a hydrogen rich gas stream. The fuel reformer 10, containing one or more reactors, reforms the hydrocarbon fuel through the processes of partial combustion and the steam reforming reaction. The reformer 10 receives a hydrocarbon fuel stream 12 and water in the form of steam from a water stream 14. In some fuel reformers 10 air is also used in combination with the partial oxidization/steam reforming reaction and admitted via an air stream 16. The flow rates of the hydrocarbon fuel stream 12, the water stream 14, and the air stream 16 are metered with flow meters 18, 22, and 24 respectively. The hydrocarbon fuel undergoes a conversion which produces a reformate stream 36, containing amounts of carbon dioxide ($CO_2$) and carbon monoxide (CO).

The reformate stream 36 is rich in hydrogen and provides a hydrogen source for the anode in the fuel cell, but also contains CO. Due to the undesirable nature of CO and its undesirable effects on the anodes in the fuel cell 30, CO must be removed or reduced to very low concentrations that are not deleterious to the anode catalyst (e.g., concentrations less than about 20 ppm in conventional systems). The reformate stream 36 exiting the reformer 10 may undergo several steps prior to entry to the fuel cell 30. By way of further explanation, it is known that the carbon monoxide (CO) level of the reformate can be reduced by utilizing a water gas shift reaction, also referred to as WGS or shift. In the optional shift reactor (not shown), water (i.e., steam) is added to the reformate/air flow exiting the reformer, in the presence of a suitable catalyst, to lower its temperature, and increase the steam to carbon ratio therein. The higher steam to carbon ratio serves to lower the CO content of the reformate according to the following ideal shift reaction: $CO+H_2O \rightarrow CO_2+H_2$. The shift reaction is problematic in that some CO still survives the shift reaction depending on the reformate flow rate and the steam injection rate. Therefore it is necessary to further remove carbon monoxide from hydrogen rich reformate stream to provide a suitable feed stream for the fuel cell. A water gas shift reactor (WGS) may be used between the reformer and the PROX described earlier and further hereinbelow. The presence of a WGS is not a factor in the overall compensation of PROX air adjustment for several reasons. Water flow rate is usually the only reactant variable in the WGS reaction but is usually held relatively constant. There are cases where water addition is used to cool the reformate stream before and/or after entering the WGS reactor and may give rise to variations in total reformate flow rate. However, this is compensated by the ECM. The CO output of the WGS reactor is relatively predictable based on the reactor temperature with sufficient water present. The ECM is able to compensate for changes in water flow or temperature and provide this input to the PROX air control adjustment calculation. However, these changes relative to water would be quite slow relative to the transient flows caused by pressure changes which are the subject of the present invention. The additional volume of the WGS reactor itself would only affect the value of the lag filter coefficient–k, but not the overall compensation logic utilized in the present invention.

In order to further reduce the CO content of $H_2$-rich reformate exiting the shift reactor, the PROX (preferential oxidation) reaction is conducted in a suitable PROX reactor 20. The PROX reactor 20 generally comprises a catalyst bed operated at temperatures which promote the preferential oxidization of the CO by air in the presence of hydrogen but without consuming/oxidizing substantial quantities of $H_2$. The PROX reaction is: $CO+\frac{1}{2}O_2 \rightarrow CO_2$.

Often the $O_2$ required for the PROX reaction will be about 2 times the stoichiometric amount required to react the CO in the reformate. If the amount of $O_2$ is excessive, then excessive consumption of $H_2$ results. On the other hand, if the amount of $O_2$ is not more than the stoichiometric amount needed, insufficient CO oxidation will occur. The PROX process is described in a paper entitled, "Methanol Fuel Processing For Low Temperature Fuel Cells" published in the Program and Abstracts of the 1988 Fuel Cell Seminar, Oct. 23–26, 1988, Long Beach, Calif., and in U.S. Pat. Nos. 5,271,916 to Vanderbourgh, et al and 5,637,415 to Meltzer et al, inter alia. 5,271,916; 5,637,415; and 5,316,871 are each incorporated herein by reference in their entirety.

PROX reactors 20 may be either (1) adiabatic, (i.e., where the temperature of the catalyst is allowed to change during oxidation of the CO), or (2) isothermal (i.e., where the temperature of the catalyst is maintained substantially constant during oxidation of the CO). The adiabatic PROX process typically includes a number of sequential stages which progressively reduce the CO content. Temperature control is important in adiabatic systems, because if the temperature rises too much, a reverse water-gas shift reaction (RWGS) can occur which typically produces more CO. The preferred isothermal reactor can produce the same CO reduction as the adiabatic process, but in fewer stages (e.g., one or two stages) and without concern for the reverse shift reaction. In either case (i.e., adiabatic or isothermal), a controlled amount of $O_2$ injected at injector 28, preferably as air, is mixed with the reformate 36 exiting the optional shift reactor (not shown), and the mixture is subsequently passed through a suitable PROX reactor 20, described in detail below.

Currently, the amount of air added to the PROX reactor 20 of a fuel cell system is calculated based solely on the rate at which reactants are being added to the inlet streams, 12, 14, 16 of the fuel reformer 10 and the computed CO content based upon the known reaction kinetics. A PROX reactor 20 must have the proper amount of air added to the inlet stream to function optimally. Too little air results in too high of CO levels leaving the PROX reactor 20 and going to the fuel cell 30. Too much air results in excessive consumption of hydrogen. The PROX reactor 20 inlet stream is set from the reformer 10 outlet stream 36. At steady state, the reformer 10 produces a constant flow of gas at a constant composition and at a constant pressure. However, the fuel cell system undergoes frequent changes in operation which result in transient conditions within the reformer 10 and the air injection, or flow rate of air 28, requirements to the PROX reactor 20. These transients result in PROX reactor air injection errors and reduce optimal control of the PROX reactor 20. Sources of transients include changes brought about by varying restrictions downstream of the reformer 10, varying reformer inlet stream 12, 14, 16 flow rates to the reformer due to varying power requirements, or some combination of varying flow rates and downstream restrictions.

In the present invention, these transients are detected in the change of pressure as measured by pressure gauge 26 on the reformer 10. The reformer 10 has an internal void volume associated with it. Utilizing the ideal gas laws, and the known void volume of the reformer 10, a formula is derived to predict changes in the flow rate out of the reformer 10. The changes in the flow rate out of the reformer 10 are directly proportional to changes in flow rate into the PROX reactor 20. The changes in the flow rate requires only monitoring of the reformer pressure, and is predicted according to the following formula:

$$\phi = V_0 \times (1 - P_1/P_2)/(P_1/P_2 \times (T_2 - T_1)), \text{ where:} \qquad \text{Equation 1}$$

$\phi$ is the flow rate (liters/sec),
$V_0$ is the reformer vessel void volume (liters),
$P_1$ is pressure at time $T_1$ (Pascals),
$P_2$ is pressure at time $T_2$ (Pascals), and
$T_1$ and $T_2$ are the two times (seconds) respectively.

A calculated amount of air to be supplied to a downstream vessel, in this embodiment the preferential oxidizer 20, is determined from the amount of CO produced in the reformer 10 based upon the inlet flow rates to the reformer 10. The calculated amount of air injected into the system at injector 28 to the PROX reactor 20 can be modified by this formula using the pressure based flow transients, thereby minimizing air injection errors. An adjustment to the flow rate of oxidant results from monitoring at least two pressures, $P_{n-1}$ and $P_n$ at respective different points in time, $T_{n-1}$ and $T_n$, effectively computing a rate of change in pressure. Then, the flow rate of oxidants ($FO_n$) at time $T_n$ is based upon the estimated flow of oxidants, also referred to as oxidant feed stream (OFS). Such OFS is determined according to the inlet flow rates of reactants to the upstream vessel, which is the reformer 10 in a typical fuel cell system. As an example, when the fuel is methanol, and the reformer is a methanol/steam reformer, the estimated flow rate of air (OFS) is determined from the equation:

$$OFS = (3 \times MeOH_{flow}/MW_{MeOH} + H2O_{flow}/MW_{H2O}) \times MW_{air} \times \% \\ PROXair, \text{ where:} \qquad \text{Equation 2}$$

OFS is the calculated total flow of air (kg/sec),
$MeOH_{flow}$ is the flow rate of methanol, i.e. fuel (kg/sec),
$MW_{MeOH}$ is the molecular weight of methanol,
$H_2O_{flow}$ is the flow rate of steam (kg/sec),
$MW_{H2O}$ is the molecular weight of steam,
$MW_{air}$ is the molecular weight of air, and
% PROXair is the molar percentage of PROX air.

The oxidant feed stream (OFS) is the starting point and basis upon which changes in the flow rate of oxidant are made relative to.

An aspect of this invention is that the oxidant is changed by the adjusted amount in a delayed response and this is accomplished by the use of a software lag filter. The purpose of a delayed response, through the use of a lag filter, is to account for the reality that a change in conditions in the reformer 10 reactor takes time to show a change in the inlet conditions to the PROX reactor 20. Factors influencing the magnitude of the delay include the length and internal volume of pipe between the vessels, valves, etc. that affect the length of time it takes for an event occurring in the reformer 10 to be felt in the PROX reactor 20. Therefore, the amount of air to be injected at injector 28 is based on the inlet flow rates of the reactants to the reformer 10 and the reformer pressure as measured at the reformer pressure gauge 26, and is as follows:

$$FO_n = OFS - k \times (P_{n-1}/P_n) \times (OFS - FO_{n-1}), \text{ where:} \qquad \text{Equation 3}$$

OFS is the oxidant feed stream based upon the inlet flows 12, 14, 16 to the reformer 10 (kg/sec),
$P_n$ is the vessel pressure measured at gauge 26 at time $T_n$ (Pascals),
$P_{n-1}$ is the pressure measured at gauge 26 of the vessel at an earlier time $T_{n-1}$ (Pascals),
$FO_{n-1}$ is the PROX reactor air injection at injector 28 at the earlier time (kg/sec),
k is the lag filter coefficient, and
$FO_n$ is the new air injection at injector 28 calculated at time $T_n$ (kg/sec).

Using this invention, inlet streams 12, 14 and 16 to reformer 10 are measured with flow meters 18, 22, and 24 respectively. The flow meters 18, 22, 24 generate signals that are read by an electronic control module (ECM) 40. A pressure is generated in the reformer 10 and is measured by the pressure gauge 26. The pressure gauge 26 is preferably located on the reformer 10. This location provides a more accurate measure of pressure changes within the reformer 10. The pressure gauge 26 sends a signal indicating the pressure to the ECM 40. The flow rates of the inlet streams 12, 14, 16 provide the information for the OFS to be used in equation 3. The ECM 40 utilizes the pressures determined from the pressure gauge 26 and computes a new flow rate of oxidant using equation 3. The ECM 40 controls the oxidant injection by an air injector 28 into the PROX reactor 20. The air may be injected into the PROX reactor 20, or preferably into the PROX inlet stream 36. As an alternative, the reformer pressure may be measured in the reformer outlet stream 36, or at the inlet to the PROX reactor 20. The location of the pressure gauge 26 will affect the magnitude of the lag filter coefficient and choice of location of the gauge 26 may be affected by constraints in the design of a particular system. While flow meters are discussed as the method to measure the flow rates of the various streams, the invention is not limited to the use of flow meters, but is intended to cover any method of measuring flow and generating a signal to be sent to the ECM 40. Likewise, while a pressure gauge is discussed as the method for determining the pressure within the reformer 10, the invention is intended to cover any method of measuring pressure and generating a signal to be sent to the ECM 40. In addition, the signal generation is not intended to be limited to electronic signals, but to any method for generating a signal that can be processed and interpreted by the electronic control module 40.

Advantageously this invention can be applied to other reactors within the fuel cell systems, such as the PROX reactor 20 and the fuel cell 30. The PROX reactor 20 treats the hydrogen rich gas and produces a hydrogen rich gas stream 38 with a reduced CO content, and is fed to the fuel cell 30. The inlet stream 36 to the PROX reactor 20 has been determined, and the pressure in the PROX reactor 20 is measured with the pressure gauge 32. In an alternate method, the inlet stream 36 to the PROX reactor 20 can be determined with the use of a flow meter (not shown). The pressure gauge 32 sends a signal indicating the pressure to the ECM 40. The ECM 40 determines the composition of the PROX reactor outlet stream 38. Hydrogen rich gas in the PROX reactor outlet stream 38 is fed to the anode side of the fuel cell 30, and contains a small amount of residual CO from the PROX reactor 20. A small amount of air injected 34 into the fuel cell 30 reacts with the CO and reduces the level of CO below deleterious levels.

Currently, the amount of air injected 34 into the fuel cell 30 is a constant amount. Too little air injection 34 will result in insufficient CO combustion and removal from the fuel cell, and too much injection will result in more hydrogen consumption and a reduction in the fuel cell efficiency. Control of air injection 34 to the fuel cell 30 is controlled in the same manner as air injection via injector 28 to the PROX reactor 20. Using equation 3, the air injection at injector 34 is calculated using the inlet flow stream 36 to the PROX reactor 20 and the pressure in the PROX reactor 20, where OFS is the calculated air injection from the inlet flows to the PROX reactor, $P_n$ is pressure in the PROX reactor at time $T_n$, $P_{n-1}$ where the pressure of the PROX reactor in earlier time $T_{n-1}$ $FO_{n-1}$ is the fuel cell air injection at the earlier time, k is the lag filter coefficient, and $FO_n$ is the new air injection of the fuel cell calculated at time $T_n$. The air injection is controlled through a second air injector 34, and the air injector 34 is controlled by the ECM 40.

In another embodiment, the ECM 40 can calculate the reformer outlet stream 36 from the reformer inlet streams 12, 14, 16 and the reformer pressure 26. Using equation 3, the ECM 40 can determine air injection to the PROX reactor 20 and the fuel cell 30. The ECM 40 will use a lag filter coefficient to control the PROX air injector 28, and will use a different lag filter coefficient to control the fuel cell air injector 34. In this embodiment, the invention is expanded to include both the PROX reactor 20 and the fuel cell 30. At steady state, the inlet feed streams 12, 14, 16 to the reformer are known and produce a steady outlet stream 36 of known composition, or CO content. The PROX reactor 20 is injected with a steady stream of air, oxidant flow stream OFS, at injector 28. The PROX reactor 20 produces a steady outlet stream 38 of known composition, or CO content. The fuel cell 30 is injected with a steady stream of air, oxidant flow stream OFS, at injector 34 to oxidize the residual CO in the fuel cell feed stream 38. When a change in conditions occur, a change in the amount of CO produced in the reformer 10 occurs. The change in CO content is determined by the change in pressure in the reformer 10. This effect is eventually felt by the PROX reactor 20 and the fuel cell 30.

By the use of an appropriate lag filter coefficient k for the PROX reactor 20 and a second lag filter coefficient k1 for the fuel cell, adjustments to the oxidant injections occur at the injector 28 to the PROX reactor 20 and the injector 34 to the fuel cell 30.

In yet another embodiment of the invention, the ECM 40 will utilize the reformer inlet streams 12, 14, 16 and the reformer pressure 26 to calculate the reformer outlet stream 36. The ECM 40 determines the air injection 28 to the PROX reactor 20, and determines an initial correction to the air injection 34 to the fuel cell. Utilizing the information for the PROX inlet stream 36, the PROX air injection 28, and the pressure 32 of the PROX reactor 20, the ECM 40 determines a further correction to the fuel cell air injection 34. It is understood, that the invention applies to any oxidant injection stream, whether air, oxygen, an oxygen rich gas, or gaseous mixture containing an appropriate oxidant.

Tests were run to study the effect of changes in operating conditions on the amount of CO in the reformate stream. Using the prior art for controlling air injection, fuel cell systems were run at a constant power for a period of time and then the power level of the fuel cell was changed to a second power level and run at the second power level for a period of time. The power level of the fuel cell system was run at about 80% capacity for a period of time, then reduced to about 20% capacity and run for a period of time. The cycle of increasing to 80%, running for a period of time, then decreasing to 20% and running for a period of time was repeated. As shown in FIG. 2, during the periods when the power levels were changed, CO concentrations in the PROX reactor 20 outlet changed due to the transient conditions. CO concentrations were measured in the PROX outlet stream 38. Although the PROX reactor air 28 was adjusted to the changing reformer inlet flows, when the power levels dropped from 80% to 20% CO concentrations in the PROX outlet stream 38 would increase dramatically to very high levels, often in the excess of 3,000 ppm. The high levels of CO were of short durations, but were at levels much too high for the fuel cells 30, and would have harmful effects on fuel cells. In an expected normal operating condition, the power levels are expected to continuously fluctuate, and CO levels can remain at unacceptably high levels for longer periods of time.

The present invention when applied to the fuel cell system was run under the same general conditions, i.e. the operating power levels. The fuel cell system was run at a power level of about 80% capacity for a period of time, then the power level was reduced to about 20% capacity and run for a period of time. The process of increasing to an 80% power level, running for a period of time, then decreasing to a 20% power level and running for a period of time was repeated. Using the present invention to control the air injection 28 to the PROX reactor 20, the air injection 28 was further adjusted during the transient period. This resulted in significant reductions in the CO levels of the PROX outlet stream 38 during transient periods of operation such as changing power levels, as shown in FIG. 3.

This invention provides a significant improvement in the air injection control, and provides a simple yet very effective method of protecting the fuel cell catalysts from the deleterious effects of carbon monoxide. This pressure compensation method is relatively more accurate when the two vessel temperatures remain relatively constant over time, and is relatively less accurate when the two vessel temperatures diverge over time.

While this invention has been described in terms of certain embodiments thereof, it is not intended that is to be limited to the above description, but rather only to the extent set forth in the following claims. This invention can be extended to other types of gas reactors and is not confined to reactors involved in the oxidation of CO to $CO_2$.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

What is claimed is:

1. A method of controlling oxidant supply for oxidizing carbon monoxide in an $H_2$-rich reformate stream produced by a reformer and supplied to a fuel cell comprising:

determining a flow rate of one or more inlet streams to the reformer;

utilizing the flow rate of one or more inlet streams to the reformer to determine a flow rate of reformate in an outlet stream from the reformer and determining the carbon monoxide content of the reformate in the reformer outlet stream;

utilizing the determined flow rate of the reformate in the reformer outlet stream and the determined carbon monoxide content to derive a flow rate of oxidant supply to the reformate in the reformer outlet stream to oxidize at least a portion of the carbon monoxide content therein;

determining a rate of change of pressure in the reformer; and utilizing the rate of change of pressure in the reformer to adjust the flow rate of oxidant supply.

2. The method of claim 1 wherein the oxidant supply and the reformate are reacted in a preferential oxidizer disposed between the reformer and the fuel cell.

3. The method of claim 1 wherein the oxidant supply is injected into the reformate at an inlet to the anode side of the fuel cell.

4. The method of claim 1 wherein a first portion of the oxidant supply is injected into a preferential oxidizer and second portion of the oxidant supply is injected into the reformate upstream of the fuel cell.

5. The method of claim 1 wherein:

the flow rate of oxidant supply is determined according to $FO_n = OFS - k*(P_{n-1}/P_n)*(OFS - FO_{n-1})$, wherein OFS is the oxidant flow determined from the inlet streams to the reformer, $P_n$ is the pressure of the reformer at time $T_n$, $P_{n-1}$ is the pressure of the reformer at an earlier time $T_{n-1}$, $FO_{n-1}$ is the flow rate of oxidant supply at said earlier time, k is a lag filter coefficient, and $FO_n$ is the flow rate of oxidant supply.

6. The method of claim 1 wherein the determined CO content is based upon reaction kinetics in the reformer.

7. A method of controlling oxidant supply to oxidize carbon monoxide in a reformate stream in a preferential oxidizer downstream of a reformer and to oxidize any remaining carbon monoxide in the reformate stream supplied to a fuel cell downstream of the preferential oxidizer, comprising:

determining a flow rate of one or more inlet streams to the reformer;

determining a rate of change of pressure in the reformer;

utilizing the flow rate of one or more inlet streams to the reformer and the rate of change of pressure in the reformer to determine a flow rate of reformate in the outlet stream of the reformer and the carbon monoxide content of the reformate in the reformer outlet stream;

utilizing the determined carbon monoxide content to determine oxidant requirements to the preferential oxidizer to oxidize at least a portion of the carbon monoxide content of the reformate in the reformer outlet stream;

determining a flow rate of one or more inlet streams to the preferential oxidizer;

determining a rate of change of pressure in the preferential oxidizer;

utilizing the determined flow rate of the one or more inlet streams to the preferential oxidizer and the rate of change of pressure in the preferential oxidizer to determine a flow rate of an outlet stream from the preferential oxidizer and the carbon monoxide content in the outlet stream from the preferential oxidizer; and utilizing the determined flow rate of the outlet stream from the preferential oxidizer and the determined carbon monoxide content in the outlet stream from the preferential oxidizer to determine oxidant requirements to oxidize any remaining carbon monoxide in the outlet stream from the preferential oxidizer.

8. The method of claim 7 wherein:

the flow rate of oxidant to the preferential oxidizer is determined according to $FO_n = OFS - k*(P_{n-1}/P_n)*(OFS - FO_{n-1})$, wherein OFS is the oxidant flow determined from the inlet streams to the reformer, $P_n$ is the pressure of the reformer at time $T_n$, $P_{n-1}$ is the pressure of the reformer at an earlier time $T_{n-1}$, $FO_{n-1}$ is the flow rate of preferential oxidizer oxidant at said earlier time, k is a lag filter coefficient, and $FO_n$ is the flow rate of preferential oxidizer oxidant; and the flow rate of oxidant to the fuel cell is determined according to $FO1_n = OFS1 - k1*(P1_n/P1_n)*(OFS1 - FO1_{n-1})$, wherein OFS1 is the oxidant flow determined from the inlet streams to the preferential oxidizer, $P1_n$ is the pressure of the preferential oxidizer at time $T_n$, $P1_{n-1}$ is the pressure of the preferential oxidizer at an earlier time $T_{n-1}$, $FO1_{n-1}$ is the flow rate of fuel cell oxidant at said earlier time, k1 is a lag filter coefficient, and $FO1_n$ is the flow rate of fuel cell oxidant.

9. In a system having a first vessel upstream of a second vessel wherein the second vessel is used to oxidize a constituent of a gas stream supplied from said first vessel, a method of controlling oxidant flow to the second vessel comprising:

measuring the flow rate of inlet streams to the first vessel;

utilizing the flow rates of the inlet streams to the first vessel to determine a flow rate of an outlet stream from the first vessel;

utilizing the flow rate of the outlet stream from the first vessel to determine a flow rate of oxidant to the second vessel;

determining a rate of change of pressure in the first vessel; and utilizing the rate of change of pressure in the first vessel to adjust the flow rate of oxidant to the second vessel.

10. The method of claim 9 wherein:

the pressure of the first vessel is determined; and the rate of oxidant injection is determined according to $FO_n = OFS - k*(P_{n-1}/P_n)*(OFS - FO_{n-1})$, wherein OFS is the oxidant flow based upon requirements from the inlet streams, $P_n$ is the pressure of the first vessel at time $T_n$, $P_{n-1}$ is the pressure of the first vessel at an earlier time $T_{n-1}$, $FO_{n-1}$ is the flow rate of oxidant at said earlier time $T_{n-1}$, k is a lag filter coefficient, and $FO_n$ is the flow rate of oxidant.

11. The method of claim 9 wherein the second vessel is a preferential oxidizer in a fuel cell system, and the first vessel is a reformer in the system.

12. A method of controlling oxidant supply for oxidizing carbon monoxide in an $H_2$-rich reformate stream produced by a reformer and supplied to a fuel cell comprising:

determining a flow rate of one or more inlet streams to the reformer;

utilizing the flow rate of one or more inlet streams to the reformer to determine a flow rate of reformats in an outlet stream from the reformer;

utilizing the determined flow rate of the reformate in the reformer outlet stream to derive a flow rate of oxidant supply to the reformate in the reformer outlet stream to oxidize at least a portion of the carbon monoxide content therein;

determining a rate of change of pressure in the reformer; and utilizing the rate of change of pressure in the reformer to adjust the flow rate of oxidant supply.

13. The method of claim 12 wherein the oxidant supply and the reformate are reacted in a preferential oxidizer disposed between the reformer and the fuel cell.

14. The method of claim 12 wherein the oxidant supply is injected into the reformate at an inlet to the fuel cell.

15. The method of claim 12 wherein a first portion of the oxidant supply is injected into a preferential oxidizer and second portion of the oxidant supply is injected into the reformate upstream of the fuel cell.

16. The method of claim 12 wherein:

the flow rate of oxidant supply is determined according to $FO_n = OFS - k*(P_{n-1}/P_n)*(OFS - FO_{n-1})$, wherein OFS is the oxidant flow determined from the inlet streams to the reformer, $P_n$ is the pressure of the reformer at time $T_n$, $P_{n-1}$ is the pressure of the reformer at an earlier time $T_{n-1}$, $FO_{n-1}$ is the flow rate of oxidant supply at said earlier time, k is a lag filter coefficient, and $FO_n$ is the flow rate of oxidant supply.

* * * * *